(12) United States Patent
Al-hemyari

(10) Patent No.: US 6,430,322 B1
(45) Date of Patent: Aug. 6, 2002

(54) OPTICAL PHASE SHIFTER HAVING AN INTEGRATED PLANAR OPTICAL WAVEGUIDE AND PHASE SHIFTER ELEMENT

(75) Inventor: Kadhair Al-hemyari, Northville, MI (US)

(73) Assignee: L3 Optics, Inc., Cambridge, MA (US)

( * ) Notice: Subject to any disclaimer, the term of this patent is extended or adjusted under 35 U.S.C. 154(b) by 45 days.

(21) Appl. No.: 09/718,664

(22) Filed: Nov. 22, 2000

Related U.S. Application Data

(60) Provisional application No. 60/167,128, filed on Nov. 23, 1999.

(51) Int. Cl.[7] ............................................. G02F 1/035
(52) U.S. Cl. ................... 385/3; 385/4; 385/10; 385/16
(58) Field of Search ............... 385/3, 4, 1, 10, 385/2, 16–24, 140

(56) References Cited

U.S. PATENT DOCUMENTS 6,195,478 B1 * 2/2001 Fouquet ..................... 385/17

* cited by examiner

*Primary Examiner*—Phan T. H. Palmer
(74) *Attorney, Agent, or Firm*—Edwards & Angell, LLP; Howard M. Gitten

(57) ABSTRACT

An optical phase shifter including a constant phase shift element or a variable phase shift element, each introducing a desired and predetermined phase shift into an optical signal passing through the phase shifter. The phase shifter has coaxial first and second waveguides each with a core defining an optical path, through the first waveguide and having an output facet, and which waveguides are separated from each other by a predetermined distance. The phase shift element is disposed between the waveguides and an actuator is coupled to the phase shift element for causing selective movement of the phase shift element.

18 Claims, 8 Drawing Sheets

FIG. 13
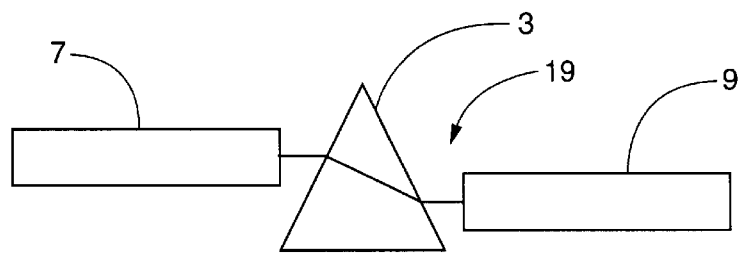
FIG. 14A
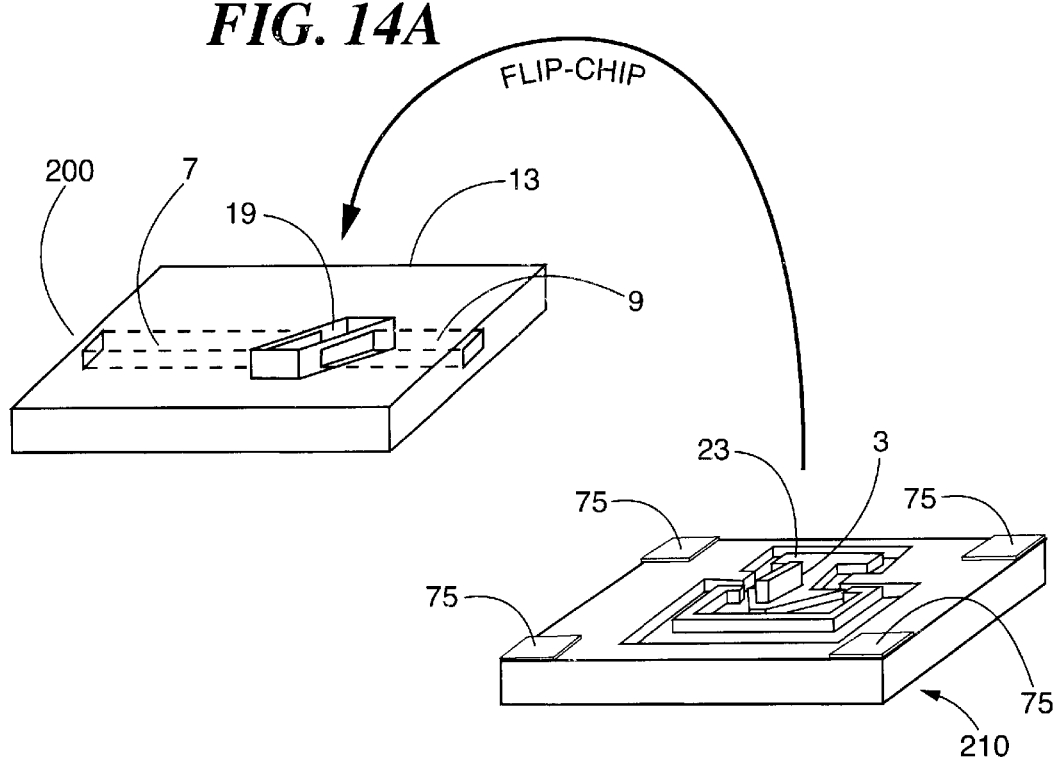
FIG. 14B

OPTICAL PHASE SHIFTER HAVING AN INTEGRATED PLANAR OPTICAL WAVEGUIDE AND PHASE SHIFTER ELEMENT

CROSS-REFERENCE TO RELATED APPLICATION

This application claims priority to Provisional Patent Application Number 60/167,128, filed on Nov. 23, 1999.

FIELD OF THE INVENTION

The present invention is directed to an optical phase shifter.

BACKGROUND OF THE INVENTION

In optical transmission, it may be desirable to manipulate an optical signal to provide the ability to route certain wavelengths in a multi-wavelength optical signal (e.g., WDM, DWDM, UDWDM, etc.) to a desired destination. One such manipulation is phase shifting. In a multi-wavelength optical signal, if a desired wavelength is phase shifted, while undesired wavelengths are not, that phase shifted wavelength can be isolated from the other wavelengths. The phase shifted wavelength may then be switched or coupled from one waveguide to another or otherwise routed to its desired destination.

It may also desirable to provide a phase shifter capable of introducing a fixed, predetermined phase shift into an optical signal. Alternatively, it may be similarly desirable to provide a phase shifter capable of introducing a selectable phase shift into an optical signal. It is further desirable that such a device be small in size and consume little power.

SUMMARY OF THE INVENTION

The present invention is directed to a phase shifter. Such a phase shifter can apply a phase shift to an optical signal passing therethrough. The phase shifter has coaxial first and second waveguides, each having a core defining an optical path therethrough, and which are separated from each other by a predetermined distance. A phase shift element is disposed between the first and second waveguides, and an actuator is coupled to the phase shift element to cause selective movement of the phase shift element between a first position in which an optical signal passing from the first waveguide to the second waveguide passes through the phase shift element, and a second position in which the optical signal does not pass through the phase shift element.

The invention accordingly comprises the features of construction, combination of elements, and arrangement of parts which will be exemplified in the disclosure herein. The scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIG. 13 is a schematic view showing offset waveguides arranged about a phase shift element;

FIGS. 14A and 14B depict the assembly of an optical switch in accordance with an embodiment of the present invention.

DETAILED DESCRIPTION OF THE PRESENTLY PREFERRED EMBODIMENTS

The present invention is directed to an optical phase shifter including a constant phase shift element or a variable phase shift element, each introducing a desired and predetermined phase shift into an optical signal passing through the phase shifter.

As used herein, the terms "light signal" and "optical signal" are used interchangeably, and may include signals such as WDM, DWDM, UDWDM signals, and the like, for example. The terms "light", "light signal" and optical signal" are intended to be broadly construed and to refer to visible, infrared, ultraviolet light, and the like.

This invention provides for and encompasses both constant phase shifters and variable phase shifters. Constant phase shifters shift the phase of an optical signal by a predetermined and fixed amount, whereas variable phase shifters can introduce a range of selectable phase shifts into an optical signal.

The phase shifters disclosed herein share a common configuration according to which light carried by a waveguide passes through a phase shift element as the light crosses between waveguides, for example, crossing a trench defined between two waveguides. The phase shift element is constructed from material having phase shifting properties. That element is selectively caused to move into and out of the trench between two waveguides (i.e., into and out of an optical signal path defined by and between two waveguides) so as to cause the phase of an optical signal passing or propagating through the trench area between the waveguides to shift.

Figure 1:
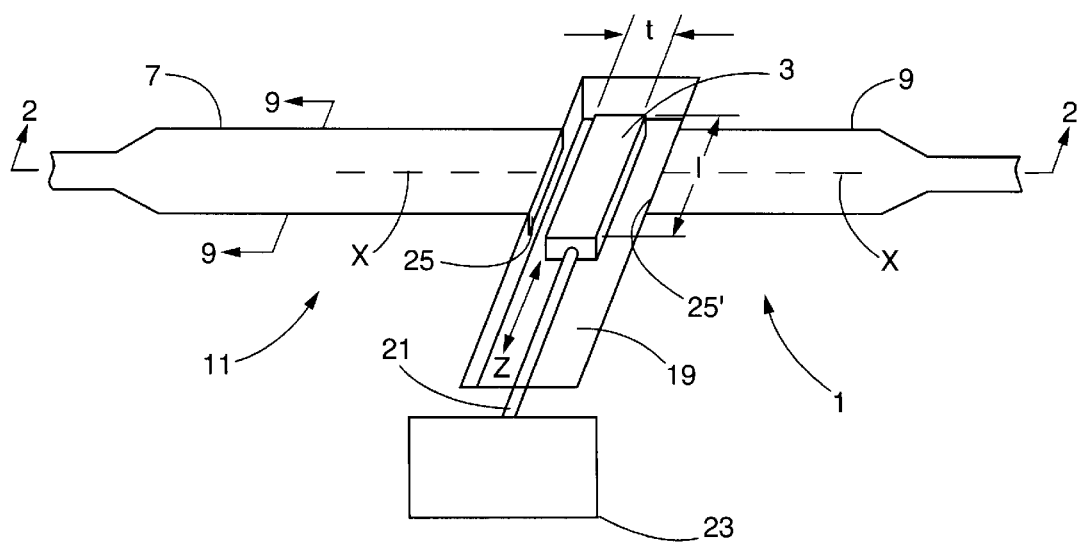
FIG. 1 is a perspective view of an optical phase shifter having a constant phase shift element and constructed in accordance with an embodiment of the present invention and depicting a first direction of movement of the phase shift element generally.

Referring next to the drawings in detail, and with initial reference to FIG. 1, a constant phase shifter according to an embodiment of the present invention is there depicted and generally designated by reference numeral 1. That phase shifter 1 incorporates a phase shift element 3 that introduces a generally constant phase shift to an optical signal directed therethrough. As shown in FIG. 1, the phase shift element 3 may be substantially planar with parallel planar walls, and is preferably oriented with its longitudinal length, l, oriented perpendicular to an optical path indicated by line X and defined by the optical paths of input and output waveguides 7, 9. The amount by which the phase of the optical signal is shifted can be controlled by selection of a material for the phase shift element 3 having a desired index of refraction (which is an inherent property of the material) and fabricating the element 3 to a particular thickness t.

Figure 2:
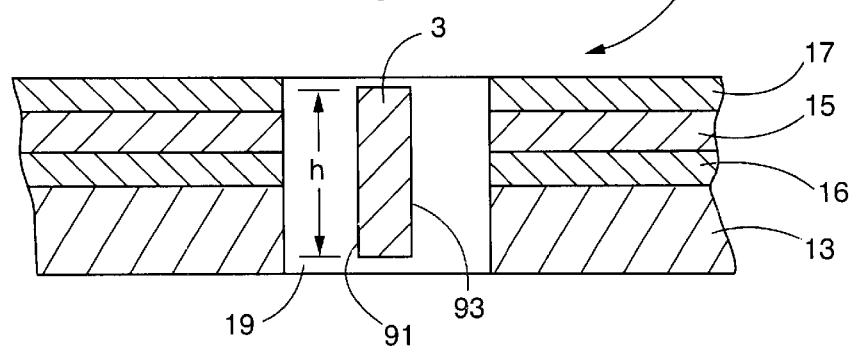
FIG. 2 is a cross-sectional side view taken along line 2—2 of the optical phase shifter of FIG. 1.

In a first embodiment of the present invention, and with reference to FIGS. 1 and 2, a phase shifter 1 includes an optical waveguide 11 (which is made up of input waveguide 7 and output waveguide 9) formed on a silicon-based substrate 13 (any other suitable substrate, for example, quartz, also could be used) and which has a core 15 sandwiched between a bottom cladding 16 and a top cladding 17. The input waveguide 7 and output waveguide 9 may be either photonic-wire or photonic-well waveguides and are separated from each other by a trench 19 defined at least partially in the substrate 13. A movable phase shift element 3 is disposed in the trench 19 and may be selectively caused to move along the trench 19 and into and out of optical path X, which is generally defined by the input and output waveguide cores 15 and along the longitudinal axes of the input and output waveguides 7, 9. The phase shift element 3 may be caused to move in a direction generally indicated by arrow Z by an actuator 23 such as, for example, an electrothermal actuator 123 (see, e.g., FIG. 7) or electrostatic actuator 223 or 323 (see, e.g., FIGS. 8A and 8B) coupled to the phase shift element 3 by a relatively rigid yet lightweight link 21. Link 57 is preferably made from a light-weight, stiff material.

The present invention is particularly applicable to waveguides which are formed on integral planar optical substrates. Generally speaking, an integrated planar optical substrate refers to a relatively flat member having a supporting substrate and a number of layers of different materials formed thereon. The substrate and the different materials have particular optical qualities such that optically useful structures such as waveguides can be formed on the supporting substrate by suitable shaping or other processing (e.g., reactive-ion etching or other suitable semiconductor etching processes).

Figure 9:
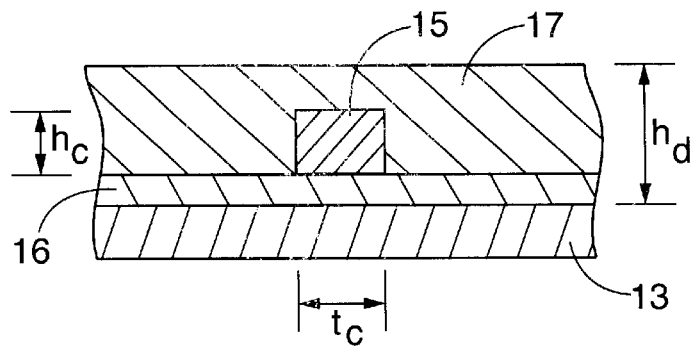
FIG. 9 is a cross-sectional view of a waveguide taken along line 9—9 of FIG. 1 and constructed in accordance with an embodiment of the present invention.

With continued reference to FIG. 1, and additional reference to FIG. 9, the waveguides 7, 9 of the present invention each have a buried core 15 that can be rectangular, with sides running from approximately 3–10 μm in height and approximately 3–5 μm wide. More preferably, the core 15 is square, with sides from approximately 6–8 μm in height and approximately 6–14 μm wide. The upper and lower cladding layers 17, 16 adjacent to core 15 can be approximately 3–18 μm thick, and are preferably approximately 15 μm thick.

The present invention will work with both weakly-confined waveguides and strongly-confined waveguides. Presently, use with weakly-confined waveguides is preferred.

Waveguides 7, 9 can be formed from a wide variety of materials chosen to provide the desired optical properties. While silica-based materials are preferable (e.g., $SiO_2$), other semiconductors that provide the desired optical properties may also be used. For example, the core 15 might include germanium oxide-doped silica deposited atop a silicon substrate 13, while the top and bottom cladding 17, 16 may include boron phosphide-doped silica glass. Other materials which could be used for the core 15 include, by way of non-limiting example, indium phosphide and gallium arsenide, and for the cladding 17, 16 include, indium phosphide, gallium arsenide, aluminum oxide, silicon nitride or polymers, or combinations thereof.

Referring again to FIG. 1, the trench 19 is filled with a medium (not shown) having a refractive index that generally differs from the refractive indices of the waveguides 7, 9 and phase shift element 3 (the refractive index of the element 3 also being different from that of the waveguides 7, 9, which can be substantially the same). That medium may include air or a vacuum, by way of non-limiting example, and need not provide refractive index matching for the medium and waveguides 7, 9.

An optical signal propagating in and guided by the core 15 of input waveguide 7 exits that waveguide via an output facet 25, passes across the trench 19, and enters the output waveguide 9 through an input facet 25'. If the phase shift element 3 is located in the optical path X, the optical signal will pass through the element 3 which will introduce a phase shift into the optical signal. The amount of phase shift (in degrees, for example) is predetermined and depends on the thickness, t, of the element 3 and on the material from which the phase shift element 3 is constructed—which determines its refractive index. If the phase shift element 3 is not located in the optical path X, the optical signal will pass from the input waveguide 7 to the output waveguide 9 without experiencing a phase shift.

Figure 11A:
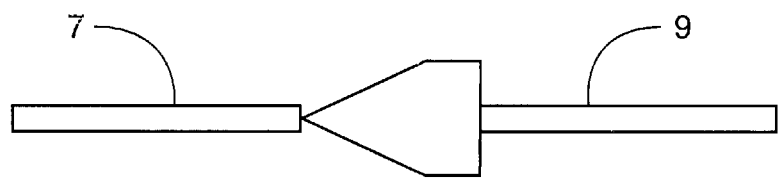
FIGS. 11A and 11B show the relationship between beam diffraction and trench length for light passing across a trench between waveguides.
Figure 11B:
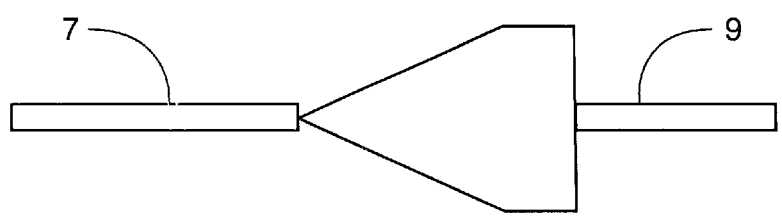

It is desirable to minimize the spacing between waveguides 7, 9, so as to reduce the possibility of diffraction (spreading) of an optical signal as it passes between the waveguides 7, 9 (see, e.g., FIGS. 11A and 11B). In part, this can be done by providing a trench 19 having a width just slightly greater than the thickness t of the phase shift element 3.

The trench can be from approximately 8–40 μm wide. Preferably, the trench is approximately 12–20 μm wide.

Another aspect of the present invention compensates for optical return loss (ORL) caused when an optical signal passes between materials having different refractive indices. The difference in refractive indices may cause part of the optical signal (in terms of optical power) to be reflected and propagate back into and along input waveguide 7, for example. That reflected signal can disadvantageously reflect back to and possibly destabilize the optical signal source. By angling the facet 25 with respect to the respective waveguide's optical path, (see, e.g., FIG. 10), any reflected signal is directed away from the waveguide core 15 and toward the cladding 16 or 17, thereby preventing the reflected light from interfering with the optical signal being guided by and propagating in the input waveguide 7 (i.e., in the core 15). For the same reasons, the facet 25' waveguide 9 also can be similarly angled. In an embodiment of the present invention, the facets 25, 25' may be disposed at an angle α of about 6° to 10° with respect to the waveguides' optical paths, and more preferably, about 8° to minimize the loss of light reflecting back into the input waveguide 7.

Figure 10:
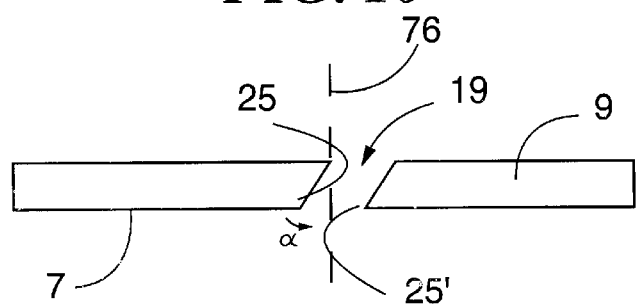
FIG. 10 is a top plan view of a waveguide and angled facets provided as part of an optical phase shifter in accordance with the present invention.

A further benefit to providing angled output and input facets 25, 25' is that, as shown in FIG. 10, it destroys the Fabry-Perot cavity that would be formed were the two facets disposed coaxially and perpendicular to one another.

Another way to reduce optical losses in the system is to apply an antireflective coating (not shown) to the waveguide facets 25, 25'.

The phase shift element 3 depicted in FIG. 1 is a constant phase shift element in that it has a relatively constant thickness t and thus introduces the same amount of phase shift into an optical signal regardless of the point on the phase shift element 3 at which the optical signal enters and exits the element 3. Generally, a phase shift element 3 is a transparent piece of material having certain optical properties, in particular, a refractive index different from that of the medium surrounding the phase shift element 3 and different from that of the waveguides 7, 9. As light encounters different refractive indices, (i.e., passes through different optical materials or between optical elements (waveguides, waveguide/resonator, etc.), the light may change speed and experience a resultant change in phase relative to light not passing through such material or between such elements. The phase shift element 3 is preferably a generally rectangular prism having an input surface 91 and an output surface 93 (see, e.g., FIG. 2) which are generally parallel with each other. As depicted in FIG. 1, the phase shift element 3 has a thickness, t. The phase shift element 3 is preferably rectangular and can be from approximately 1–8 $\mu$m thick, approximately 10–100 $\mu$m high, and approximately 10–100 $\mu$m long and can be made from any sufficiently rigid and light material. Preferably, the phase shift element 3 is approximately 2 $\mu$m thick, approximately 30–40 $\mu$m high, and approximately 30–40 $\mu$m long, and can be made from silicon. By way of non-limiting example, other materials such as polymers, metallic materials or dielectric films also could be used. In any event, the phase shift element 3 need only be high enough to ensure that an optical signal passing from waveguide 7 to waveguide 9 completely passes through the element 3. The height h (see, e.g., FIG. 2) of the phase shift element 3 may range from approximately 10–100 $\mu$m. The length of the phase shift element 3 does not affect its phase shifting characteristics, and is preferably sized so as to minimize the amount of movement required to cause the element 3 to move into and out of the optical path X. The length l may range from approximately 10–100 $\mu$m. Other than inducing a phase shift, the material from which the phase shift element 3 is constructed should not significantly alter (e.g., absorb) the characteristics of the optical signal which passes therethrough.

As shown in FIG. 1, the phase shift element 3 is coupled to actuator 23 by a stiff yet light link 21, and is sized and shaped to move reciprocally as generally indicated by arrow Z and without interference in trench 19. The actuator 23 can then be used to move the phase shift element 3 between a first position, in which the element 3 is located in the optical path X (as depicted in FIG. 1), and a second position, in which the element 3 is out of the optical path X. A phase shift is thus introduced into an optical signal when the element 3 is in the first position, and not when the element 3 is in the second position.

Actuator 23 serves to move the phase shift element 3 into and out of the optical path. While any suitable actuator could be used to implement this invention, it is presently thought that either an electrothermal or electromechanical type actuator is preferred.

Electrothermal actuators are in general known in the art, and therefore will not be described in precise detail. For the purposes of the present invention, it will be appreciated that any electrothermal actuator could be used which changes its size in response to the application of thermal energy enough to cause the desired movement of element 3 between the first and second positions. One benefit to using electrothermal actuators is that such actuators may be latching-type devices which maintain its position without the continuous application of energy. Thus, a latching-type actuator will remain in either one of two positions until it is caused to switch out of that position.

Figure 7:
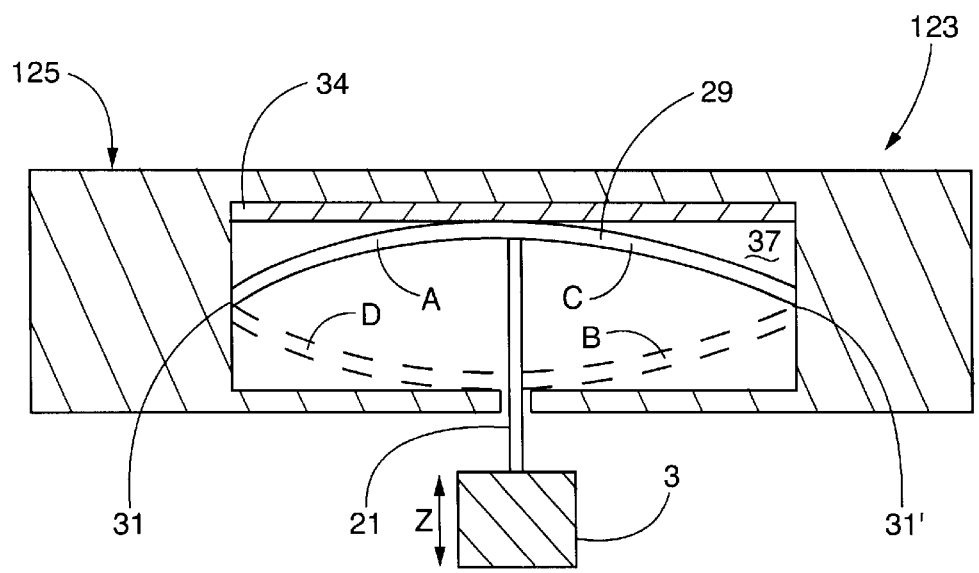
FIG. 7 is a partial cross-sectional schematic view of an electrothermal actuator in accordance with an embodiment of the present invention.

An illustrative electrothermal latching-type actuator 123 suitable for use with the present invention is depicted in FIG. 7. That actuator 123 includes a flexible member 29 which is securely fixed at endpoints 31, 31' to the walls of a cavity 33 defined with an actuator housing 125. Cavity 33 is sized and shaped to allow movement of flexible member 29 sufficient to cause the phase shift element 3 to move between the first and second positions. Also provided is a heater 34, which is located in relatively close proximity with the member 29. When the heater 34 is driven (i.e., caused to heat), the member 29 warms and expands. Since the member's ends are secured at endpoints 31, 31', the member 29 cannot simply expand so that the endpoints 31, 31' shift outward. Instead, compressive stresses will be generated along the member's length. These stresses increase until they reach a level sufficient to cause the member 29 to change its position from that indicated by reference character A to that indicated by reference character B in FIG. 7, i.e., into and out of the first and second (or second and first) positions.

Figure 8A:
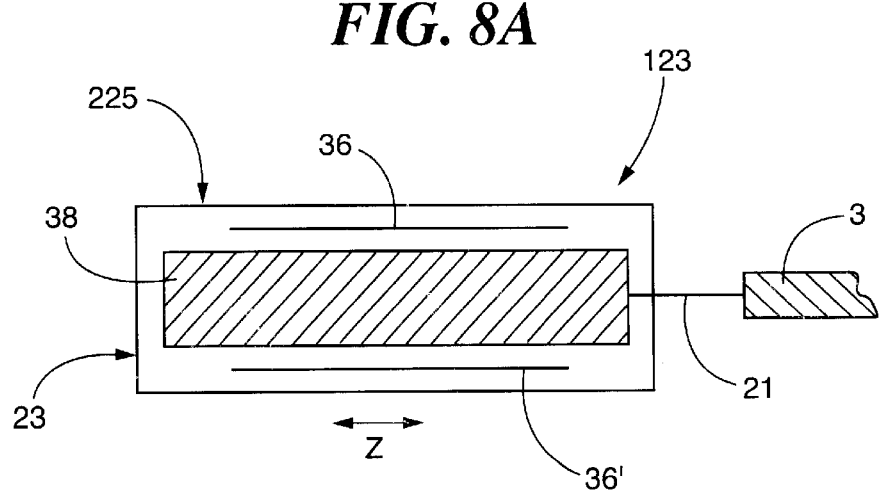
FIGS. 8A and 8B are schematic views of two embodiments of electrostatic actuators in accordance with embodiments of the present invention.
Figure 8B:
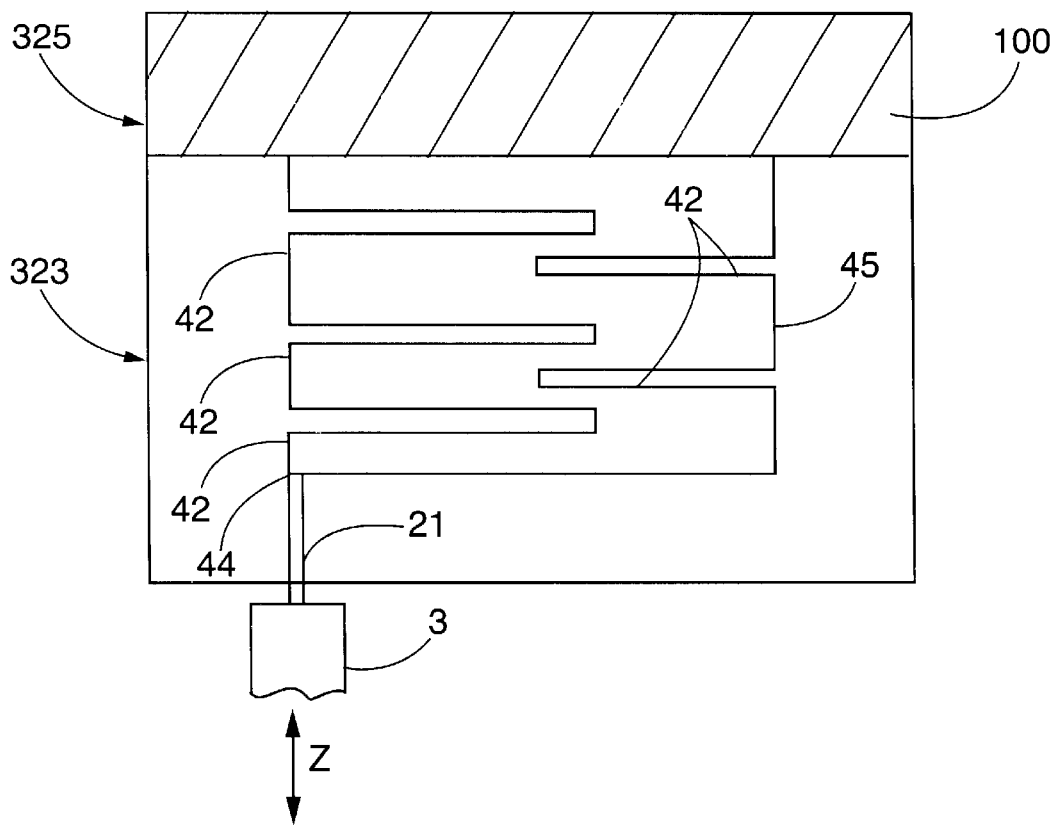

In an alternative embodiment, and with reference to FIG. 8A, an electrostatic actuator 223 may also be used to selectively move phase shift element 3. Benefits of electrostatic actuators include high operating speed, low energy consumption, and minimal system heating. One type of electrostatic actuator 223 usable in connection with the present invention is depicted in FIG. 8A. That actuator 223 includes electrodes 36, 36' located on opposite sides of a piezoelectric element 38 made from a material which expands and contracts in at least one dimension (i.e., width or length) when an electric field is applied to the electrodes 36, 36'. Piezoelectric element 38 may thus be caused to expand and contract in the direction indicated by arrow Z, imparting movement to the phase shift element 3.

It is possible that one actuator alone may not be sufficient to provide the required amount of movement for the element 3. This can be rectified by providing a piezoelectric actuator 323 having a number of interlaced fingers 42, such as that depicted in FIG. 8B. These fingers 42 are attached to a support 100 within actuator 323, which serves to secure the base of the fingers 42. When an electrical signal is applied to electrodes (not shown), the total displacement in the direction of arrow Z of endpoint 44 will reflect the cumulative displacement of all of the fingers 42. Since the displacement of endpoint 44 is the sum of the fingers' individual displacements, a significant movement of the element 3 can be achieved. This type of electrostatic actuator 323 may require the application of substantial voltage, possibly on the order of 100 V, to obtain the desired movement of the element 3. Despite the magnitude of this voltage potential, very little power is required, since the current flow through the electrostatic actuator 323 is negligible.

Figure 3:
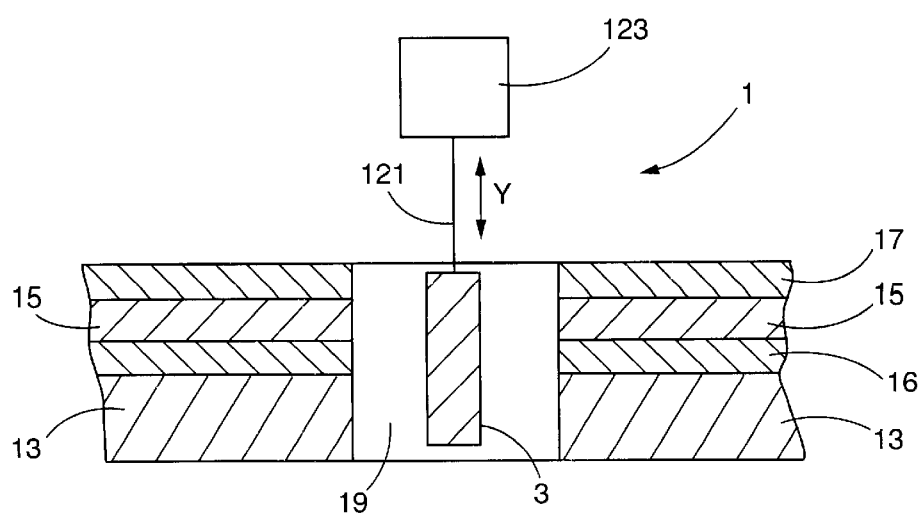
FIG. 3 is a cross-sectional side view taken along line 2—2 of the optical phase shifter of FIG. 1 and depicting a second direction of movement of the phase shift element.

It should be understood that the direction of motion of the phase shift element 3 is not limited to movement along the trench 19. Phase shift element 3 could be moved in any other direction which guides it into and out of the path of light passing between the waveguides 7, 9, so long as the phase shift element 3 can move reciprocally into and out of the first and second positions as defined herein. As shown in FIG. 3, phase shift element 3 may be caused to move in a direction generally upward, i.e., in the direction of arrow Y, along a line normal to the plane in which waveguides 7, 9 lie, or similarly, along a diagonal line intersecting that plane.

The width of the trench 19 between the input waveguide 7 and the output waveguide 9 is preferably minimized to reduce diffraction, which is the undesirable spreading of light due to diffraction. There may be diffraction of the optical signal (i.e., light beam) each time it passes between the waveguides 7, 9. Owing to this diffraction, the light beam ultimately output from the phase shifter 1 may be somewhat larger in area than the original incident beam of light as it first enters the phase shifter 1.

Depending upon the particulars of a given installation, it may or may not be necessary to compensate for this diffraction. There are several different ways to do this.

FIGS. 11A and 11B illustrate the effect of trench width upon diffraction losses. It can be seen in these drawings that as the trench width increases, the light's diffraction likewise increases. Since the light becomes more diffuse as the trench width increases, less of the original signal from waveguide 7 enters the waveguide 9. It is therefore preferable for the ends of the waveguides 7, 9 to be separated by as short a distance as is feasible, i.e., that the trench width be minimized.

There are several ways to control diffraction of the light as it crosses the trench 19. Diffraction can be controlled by separating the facets 25, 25' of waveguides 7, 9 by a distance only slightly greater than the widest point on the phase shift element 3. With reference to FIGS. 1 and 2, waveguides 7, 9 are separated by and disposed around trench 19, and are preferably arranged in a coaxial manner about the same optical path defined by their respective cores 15. So that the waveguides 7, 9 will be separated by a distance insufficient to affect the transmission characteristics of an optical signal propagating from waveguide 7 across trench 19 to waveguide 9, trench 19 should be as narrow as possible to minimize light diffraction losses in the trench 19. Trench widths on the order of 10–35 $\mu$m are presently thought to be preferable.

At the same time there are factors which limit how narrow a trench 19 may be. A narrow trench 19 may complicate aligning the facing waveguides 7, 9, and may not be able to accommodate a phase shift element of width sufficient to apply the maximum desired phase shift for the tuning range of interest.

Figure 12A:
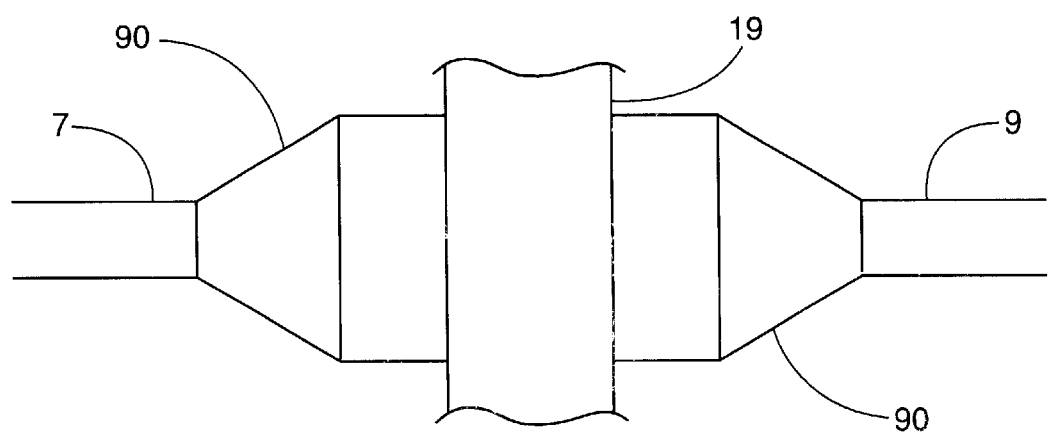
FIGS. 12A and 12B are schematic views showing exemplary ways to reduce diffraction of light passing across a trench.

As depicted in FIG. 12A, diffraction losses in wider trenches can be reduced by increasing the waveguide widths using tapers 90. Tapers 90 could be integral parts of waveguides 7, 9, or could be separate components attached thereto.

Figure 12B:
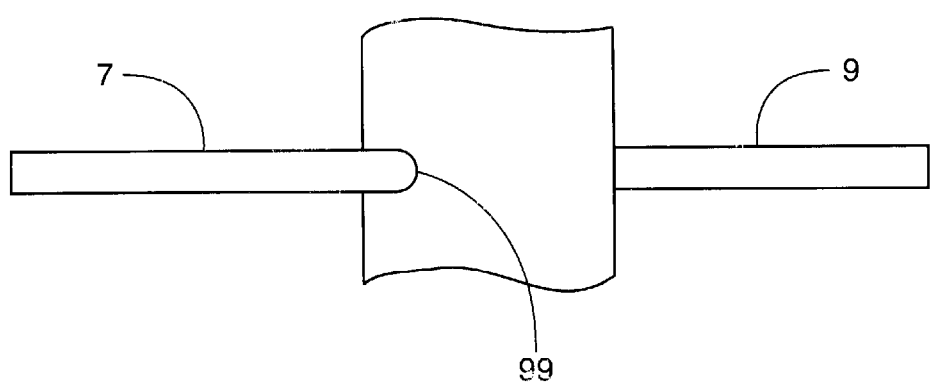

With reference to FIG. 12B, the input waveguide 7 can be provided with a lens 99 facing trench 19. Lens 99 shapes light passing from that waveguide 7 before it crosses trench 19. While such a lens 99 could be formed in a variety of ways, an etched lens is now thought to be preferred.

It also may desirable for the trench 19 to be inclined relative to the axis along which the waveguides 7, 9, are arranged (not shown). Preferably the trench 19 is inclined relative to that axis at an angle of between 4°–8°, and more preferably, between 5°–7°, and most preferably, 6°. This geometry prevents light reflecting off the phase shift element 3 from being directed back along the input waveguide 7.

Figure 4:
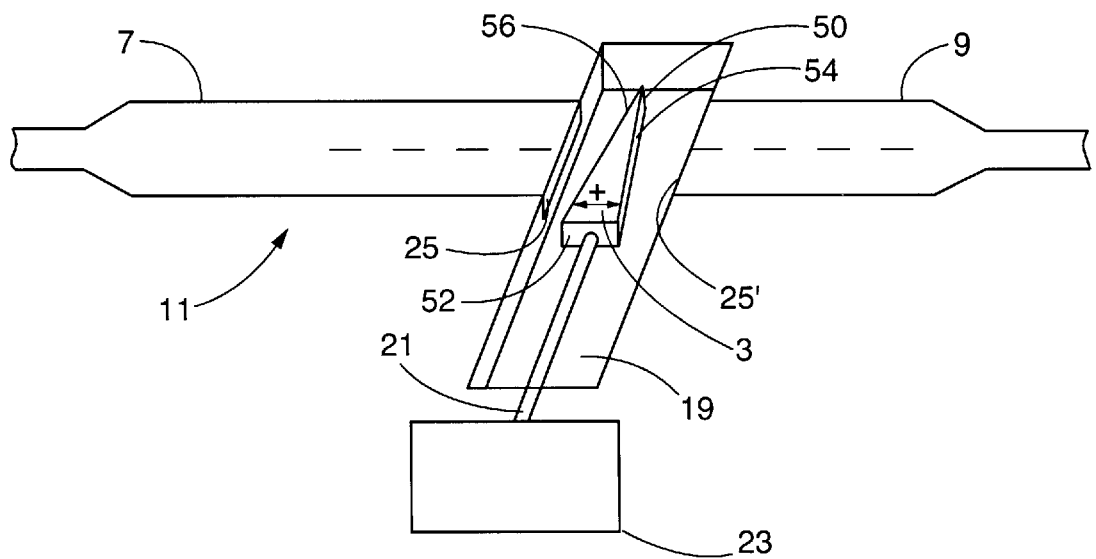
FIG. 4 is a perspective view of an optical phase shifter having a variable phase shift element and constructed in accordance with an embodiment of the present invention.

In addition to a constant phase shift element 3 along the lines of the foregoing embodiment, as discussed above and with reference to FIG. 1, the present invention is also directed to a phase shifter 1 having a variable phase shift element 3, such as depicted in FIG. 4 and discussed in detail below. Since the amount of phase shift introduced into an optical signal by the phase shift element 3 is determined, at least in part, by the thickness of the element 3, an element 3 having a variable thickness may be used to introduce a selectable, variable phase into an optical signal. The variable phase shifter 1 differs from the constant phase shifter primarily with regard to the shape of the phase shift element 3; generally tapered versus generally rectangular.

As shown in FIG. 4, tapered phase shift element 3, is generally tapered or wedge-shaped. That shape provides a range of phase shift of the element 3 from approximately 0° at the tip 50 of the phase shift element 3 to approximately 180° ($\pi$) at some point between the tip 50 and end 52 opposite the tip 50, depending upon the position of the element 3 with respect to the waveguides 7, 9. Thus, the amount of phase shift (in angular degrees) increases moving in a direction from the tip 50 to the end 52 opposite the tip. Alternatively, the orientation of the phase shift element could be reversed (not shown), so that the phase shift element's tip 50 is attached via link 21 to actuator 23. For that embodiment, consideration of the stress experienced by the tip 50, link 21, and actuator 23 may be necessary.

A variable phase shifter 1 may require a more precise actuator 23 than a constant phase shifter 1. The actuator 23 used in a constant phase shifter need only move the phase shift element 3 between one of two positions (into or out of position between the waveguides 7, 9). As long as the element 3 is positioned in the optical path, the desired phase shift will be introduced into the optical signal. For a variable phase shifter 1, the actuator 23 must move the variable phase shift element 3 from position out of the optical path to a particular and relatively precise position so that the optical signal passes through the phase shift element 3 at a particular thickness and the desired phase shift is introduced into the optical signal. For example, consider a variable phase shifter 1 having a $\pi$/(50 $\mu$m) (maximum phase shift amount over length, l, of element 3) phase shift element 3 positioned so as to introduce a $\pi$/6 phase shift into an optical signal. If it is desired to change that phase shift from $\pi$/6 to $\pi$/3, it will be necessary to increase the phase shift by $\pi$/6. This will require moving the phase shift element by approximately 8 $\mu$m, as show clearly in equation (1); which may be used to calculated the amount of movement required of the element 3 for a desired phase shift.

$$\frac{(\pi/3) - (\pi/6)}{\pi/(50 \, \mu m)} = 8 \, \mu m \tag{1}$$

It will be appreciated that such small movement requires precise control of the position of the wedge-shaped phase shift element 3.

One alternative to a more accurate actuator 23 is a more gradually sloping phase shift element 3. For example, halving the phase shift element's taper will double the distance by which the phase shift element 3 would have to be moved to cause the same magnitude phase shift. This effectively increases the accuracy of the actuator 23. For example, a phase shift element 3 having a length approximately equal to 10 $\mu$m and constructed to introduce a $\pi$ phase shift into an optical signal would have sides 54, 56 that slope at a rate approximately twice that of a 20 µm phase shift element 3.

Figure 5:
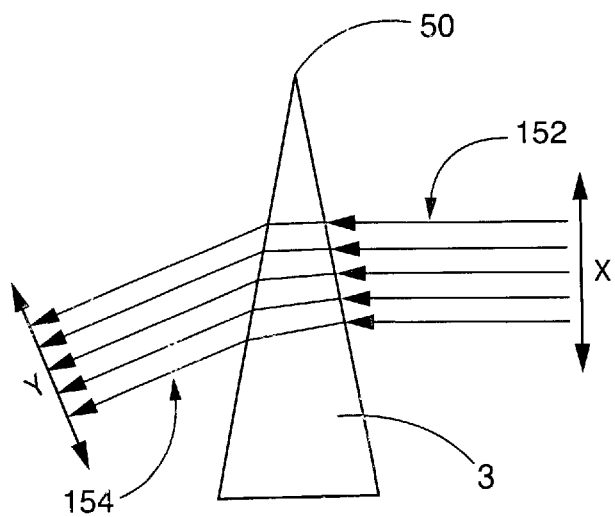
FIG. 5 is a top plan view of a light beam passing through a variable phase shift element as depicted in FIG. 4.

The tapered sides 54, 56 of the phase shift element 3 may cause an optical signal to experience a non-uniform phase shift over the width of the optical signal light beam 152 (see, e.g., FIG. 5). Since the amount of phase shift introduced into the optical signal depends, at least in part, upon the thickness of the phase shift element 3, the light beam will encounter varying thicknesses simply because the light beam has a finite width. Consequently, a part of the light beam 152 encountering a wider part of the phase shift element 3 will experience a greater phase shift than a part of the light beam 152 encountering a narrower part. If the width if the light beam 152 is relatively small in comparison to the length of the phase shift element 3, the difference in phase experienced at the outer edges of the light beam 152 (the outer edges of the light beam will experience the greatest difference in thickness of the element 3) may be too small to adversely effect further transmission of the optical signal and thus may not require correction/compensation. If, however, correction/compensation is desired, one way to reduce the difference in phase shift would be to use a very gradually tapered phase shift element 3 so that the light beam 152 experiences relatively negligible difference in thickness of the element 3 over the width if the light beam 152 thus providing a more homogeneously phase shifted optical signal. Such a phase shift element 3 could be capable of producing as wide a range of phase shifts as a more sharply tapered phase shift element, although more movement of the phase shift element 3 would be required.

The tapered phase shift element 3 can have a width ranging from approximately submicron-size at the tip to 100 µm at the widest portion, and height from approximately 10–100 µm. The tapered phase shift element 3 can be made from any sufficiently rigid and light material. Preferably, the tapered phase shift element 3 is triangular, has a tip width of approximately submicron size, a maximum width of 30–40 µm, and a height of approximately 30–40 µm The tapered phase shift element is preferably made from silicon.

Figure 6A:
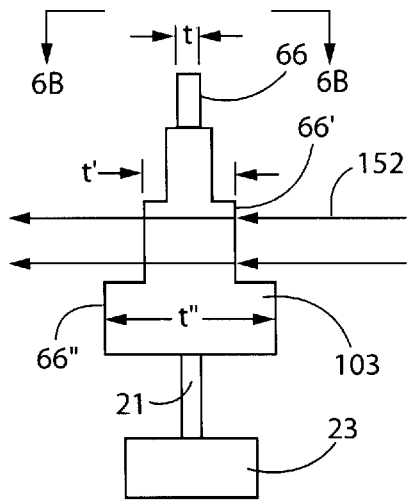
FIG. 6A is a top plan view of an embodiment of a stepped variable phase shift element.
Figure 6B:
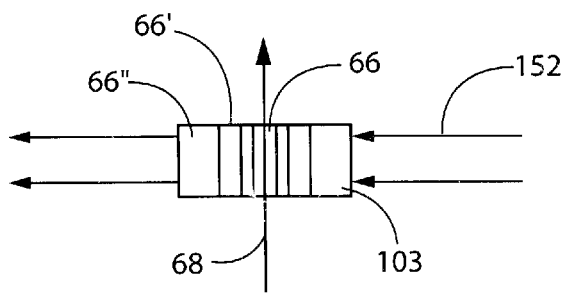
FIG. 6B is an elevational view of the stepped variable phase shift element taken along line 6—6 of FIG. 6A.

A further aspect of this invention involves an alternative configuration for the variable phase shifter 1 which reduces the above-described non-linearities in the output light beam. In this embodiment, the tapered phase shift element 3 is replaced by a stepped phase shift element 3, as shown in FIGS. 6A and 6B. The stepped phase shift element 3 consists of two or more different rectangular phase shift regions 66, 66', 66" having different thicknesses, t, t', t". Since the phase shift of light passing through each phase shift region 66, 66', 66" is a function of the phase shift region's thickness, it will be understood that thicker phase shift regions introduce a greater phase shift than thinner phase shift regions. Instead of allowing an infinite range of phase shifts from 0–π°, this arrangement provides for a discrete number of phase shifts.

The number of phase shifts possible using a stepped phase shift element 3 as depicted in FIGS. 6A and 6B will correspond to the number of phase shift regions 66, 66', 66". For example, a six-step phase shift element could provide phase shifts approximately equal to π/6, π/3, π/2, 2π/3, 5π/6 and π (it is not believed that more than ten phase shift regions would be needed). When configured as depicted in FIG. 6A, or alternatively, with the smallest thickness being located near the link 21, the stepped phase shift element 3 provides monotonic phase shifting of an optical signal. Alternatively, non-monotonic phase shifting may also be provided, as a routine matter of design choice.

Figure 6C:
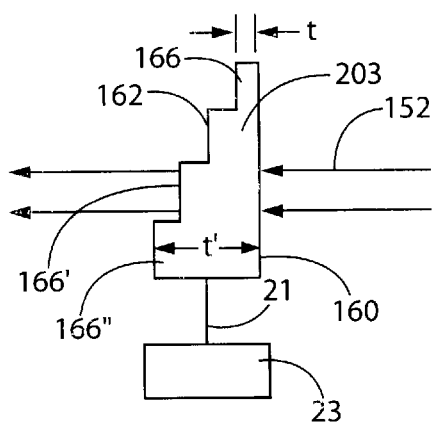
FIG. 6C is a top plan view of another embodiment of a stepped variable phase shift element.

When viewed from one end, such as depicted in FIG. 6B, for example, the stepped phase shift element 3 can be seen to have a number of phase shift regions 66, 66', 66" all arranged symmetrically about a common center plane 68 defined through the element 3. Alternatively, the stepped phase shift element 3 may have a stepped side 162 and a flat side 160, as depicted in FIG. 6C. The flat side 160 may face either waveguide 7, 9.

Individual phase shift regions 66, 66', 66" of the stepped phase shift element 3 need not be arranged either symmetrically or with a common edge plane. For example, phase shift regions 66, 66', 66" could be arranged so that the most frequently used phase shift regions are adjacent to one another (not shown). This arrangement will reduce the distance by which the phase shift element 3 would have to be moved to place those most used phase shift regions in the optical path X. Since the phase shift element 3 has to be moved a shorter distance, the phase shifter's response time would be improved.

The stepped phase shift element 3 can be fabricated either as a single integral piece or an assembly of several suitably-aligned pieces adhered or bonded together. Fabricating a single integral piece may be preferable because that avoids the need to align precisely the assembled pieces, and also avoids deformations in the optical material which might be caused by the adhering or bonding of the several pieces.

Another benefit to using a stepped phase shift element 3 is that a less precise actuator 23 may be needed, since the minimum distance by which the phase shift element 3 will have to be shifted is approximately equal to the distance between the centers of two adjacent phase shift regions. Given that the phase shift regions are themselves somewhat wider than the width of the light beam 152, the minimum amount by which the actuator 23 would move the phase shift element 3 would be somewhat larger than the width of the light beam 152.

To ensure that the light beam 152 does not simultaneously encounter two different, adjacent phase shift regions, the length of each region is preferably no less than the width of the waveguides 7, 9.

If a tapered phase shift element 3 is used in phase shifter 1, light traveling along the input waveguide 7 will, as depicted in FIGS. 5 and 13, undergo a change in direction after passing through the phase shift element 3. For example, FIG. 13 depicts one way that output waveguide 9 can be repositioned to compensate for the light's change in direction. It will be appreciated that the relative positions of the waveguides 7, 9 and the phase shift element 3 can be altered according to the phase shift element's shape.

The optical phase shifter 1 of the present invention can be monolithically formed or assembled using a flip-chip manufacturing technique, the latter being generally depicted in FIGS. 14A and 14B. In flip-chip manufacturing, the waveguides 7 and 9 and trench 19 are monolithically formed on a first chip 200 using known semiconductor fabrication techniques and processes (e.g., deposition, etching, etc.). The phase shift element 3, actuator 23 and spacers 75 are formed on a second chip 210. Prior to assembly, the two chips are oriented to face each other, and aligned so that corresponding parts (e.g., phase shift element 3 and trench 19) of the chips oppose one another. Spacers 75 regulate the distance between chips 200 and 210 as they are joined, and keep the chips from being pressed too close together. They also can be used to insure that the chips are joined in proper registration. The chips are then joined in known fashion.

Alternatively, in another embodiment of the present invention, the optical switch 1 may be constructed by monolithically forming the parts of the optical phase shifter (e.g., waveguides, phase shift element, etc.). In such an embodiment, the various parts of the optical phase shifter 1 are formed on a single substrate through the selective deposition and removal of different layers of material using now known or hereafter developed semiconductor etching techniques and processes. One of the benefits of monolithic fabrication is that it avoids the need to register the different components before the two substrates are joined.

Figure 15A:
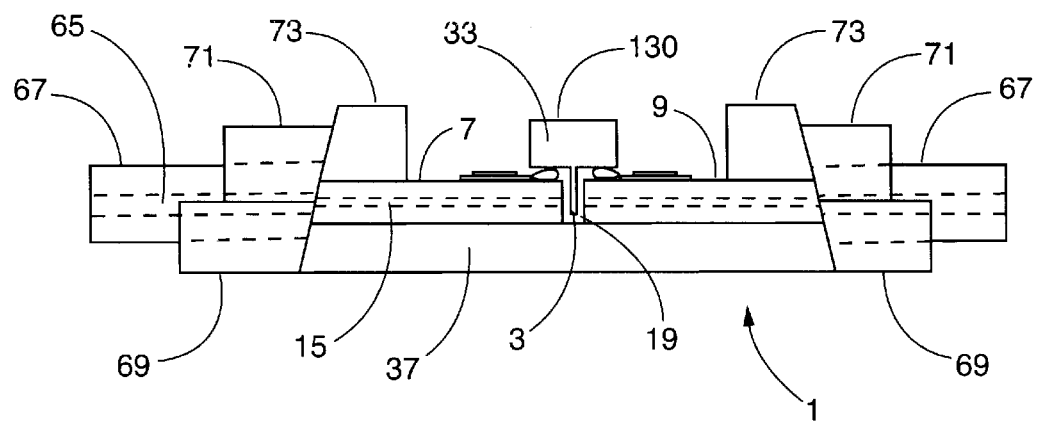
FIGS. 15A and 15B are partial side cross-sectional views showing portions of the structure of optical switches in accordance with the present invention manufactured using flip-chip and monolithic fabrication techniques, respectively, together with external components and connecting hardware.
Figure 15B:
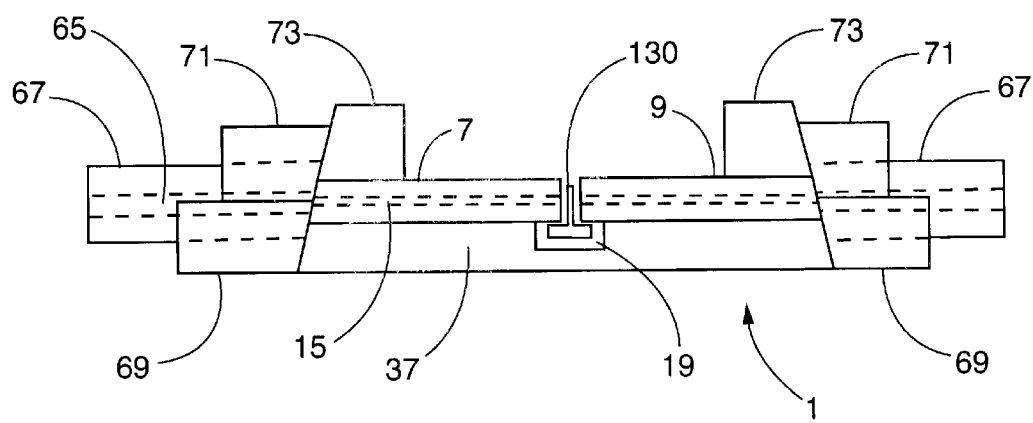

Referring to FIGS. 15A and 15B, both a flip-chip and monolithically formed optical switches 1 in accordance with the present invention are there respectively depicted. Both figures depict connection of the optical phase shifter 1 to external optical components such as, for example, optical fibers 67, such that waveguide cores 15 optically connect with fiber cores 65. Each optical fiber 67 is supported by a grooved member 69, and secured in place using a fiber lid 71. A glass cover 73 protects the underlying switch components. Alternative ways of securing the optical fibers, or of using other light pathways, also could be used.

One difference between the two fabrication techniques is the location of the switching element 130: above the waveguides for flip-chip, as depicted in FIG. 15A, and within the substrate 37 for monolithic, as depicted in FIG. 15B.

It should be understood that this invention is not intended to be limited to the angles, materials, shapes or sizes portrayed herein, save to the extent that such angles, materials, shapes or sizes are so limited by the express language of the claims.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between. In particular, this invention should not be construed as being limited to the dimensions, proportions or arrangements disclosed herein.

What is claimed is:

1. An optical phase shifter for applying a phase shift to an optical signal passing therethrough, comprising:

a first waveguide having a core defining an optical path through the first waveguide;

a second waveguide having a core defining an optical path through the second waveguide and that is coaxial with the first waveguide optical path, the first and the second waveguides being separated from each other by a trench defined therebetween;

a phase shift element disposed in the trench between the first waveguide and the second waveguide; and an actuator coupled to the phase shift element for causing selective movement of the phase shift element between a first position in which an optical signal passing from the first waveguide across the trench to the second waveguide passes through the phase shift element, and a second position in which the optical signal does not pass through the phase shift element, the phase shift element introducing the phase shift to the optical signal when the phase shift element is in the first position.

2. An optical phase shifter according to claim 1, wherein the phase shift element has two substantially planar walls.

3. An optical phase shifter according to claim 2, wherein the two substantially planar walls do not converge toward each another and wherein the phase shift element introduces a substantially constant phase shift into the optical signal.

4. An optical phase shifter according to claim 2, wherein the two substantially planar walls converge toward one another, and wherein the phase shift element has a length and a width that varies along the length, the first position being any position along the length and wherein the phase shift introduced by the phase shift element into the optical signal is determined by the width of the phase shift element.

5. An optical phase shifter according to claim 1, wherein the phase shift element has a stepped profile.

6. An optical phase shifter according to claim 5, wherein the phase shift element has the stepped profile on both sides.

7. An optical phase shifter according to claim 5, wherein the phase shift element has the stepped profile on one side.

8. An optical phase shifter according to claim 1, wherein the actuator is a latching type device.

9. An optical phase shifter according to claim 8, wherein the actuator is an electrostatic device.

10. An optical phase shifter according to claim 8, wherein the actuator is an electrothermal device.

11. An optical phase shifter according to claim 1, wherein the first and second waveguides lie in a plane, and wherein the actuator causes the phase shift element to move between the first and second positions along the trench in the plane.

12. An optical phase shifter according to claim 1, wherein the first and second waveguides lie in a plane, and wherein the actuator causes the phase shift element to move between the first and second positions into and out of the trench along a line intersecting the plane.

13. An optical phase shifter according to claim 1, wherein the phase shift has a value between approximately 0–π.

14. An optical phase shifter according to claim 1, wherein the trench width is between approximately 8–40 μm.

15. An optical phase shifter according to claim 14 wherein the trench width is between approximately 12–20 μm.

16. An optical switch according to claim 1, wherein at least one of the first and the second waveguides has a facet.

17. An optical switch according to claim 16, wherein the facet is angled with respect to a corresponding waveguide axis.

18. An optical switch according to claim 16, wherein the facet is angled by approximately 6° to 10° relative to the corresponding waveguide axis.

* * * * *